Oct. 17, 1967        H. J. MODREY        3,346,942
DEVICE FOR POSITIONING COMPONENTS
Filed Aug. 3, 1965
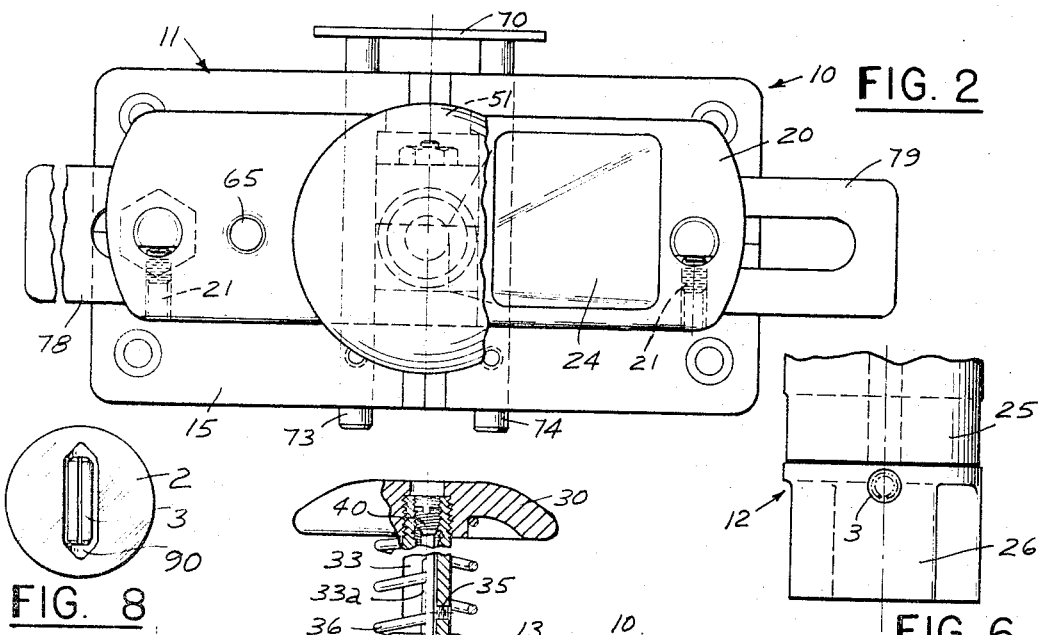
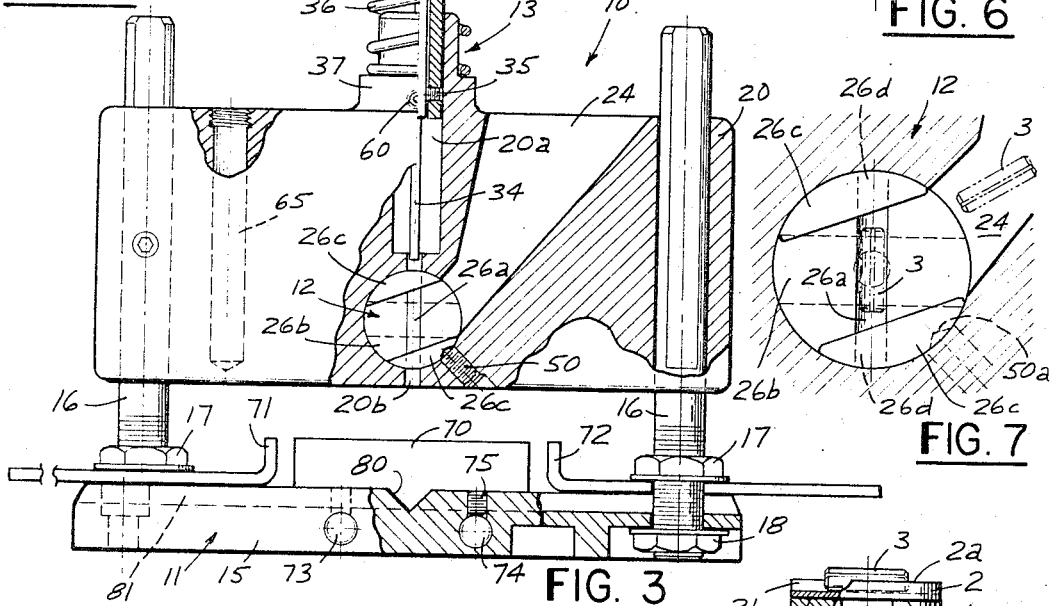
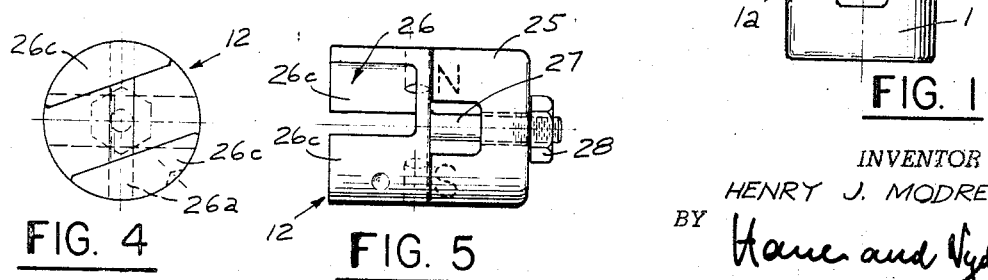
INVENTOR
HENRY J. MODREY
BY *Hane and Vydeih*
ATTORNEYS

United States Patent Office 3,346,942
Patented Oct. 17, 1967

3,346,942
DEVICE FOR POSITIONING COMPONENTS
Henry J. Modrey, Eagle Drive, Stamford, Conn. 06903
Filed Aug. 3, 1965, Ser. No. 476,839
21 Claims. (Cl. 29—212)

ABSTRACT OF THE DISCLOSURE

A device for positioning magnetizable components such as pins fed to the device. The device urges by magnetic attraction a component fed to it in random position into a predetermined position from which the component may be moved into a position of utilization.

---

The present invention relates to a device for positioning components, particularly generally cylindrical components, made entirely or at least partly of magnetizable material, preparatory to inserting the positioned components into a hole in a work piece or assembly.

While the invention is usable for generally cylindrical bodies of all sizes, including generally cylindrical bodies, a surface portion of which has a non-cylindrical configuration such as a flattened or raised surface portion, it is particularly advantageous for positioning and inserting small generally cylindrical bodies such as solid, slotted, rolled or spirally wound pins. Pins of this kind are widely used in many kinds of work pieces and assemblies and are usually force-fitted into the receiving hole, for instance, by a plunger, punch or hammer.

As is well known in the industry, the difficulty generally encountered with small pins is the handling of such pins. In most cases, the pins are picked up individually by hand from a bin or container. It requires considerable dexterity and is time-consuming to grip a single pin and to position it correctly prior to driving it home. Frequently, the pins are so short that they can be gripped only with pincers or pliers.

The difficulty of handling small pins is accentuated in automated assembly equipment. With such equipment, the pins are usually stored in a vibrating or rotating magazine from which they are released into a chute or guide channel supposed to carry the pins by gravity to the point of application. Such chute or hopper feeds for small pins represent a frequent cause of stoppage in automated assembly machines.

In descending from the magazine to the point of use, pins have to travel the length of the conveying chute or channel and must finally position themselves precisely in a position from which they can be mechanically ejected. Generally, the chute must be designed so as to confine the pins in their axial orientation. Small pins are so light that they frequently fail to reach the point of use by gravity, even if assisted by a vibratory mechanism. The gravity force available is so small that the slightest increase in friction which inevitably develops in the chute or channel, stops the descent of the pins, especially if the pins have external irregularities such as slots or bulges which interfere with a smooth rolling action.

Due again to the light weight of small pins, the velocity of the descent of the pins cannot be increased at will by selecting a steeper angle of descent for the glide path. If the descent of the pins through the chute is too precipitate, the pins tend to ride up one over the other or to jump out of the chute, or to overshoot their final position of rest at the point of use. In such event, the machine must be stopped and cleared from obstructing pins. The aforepointed out feeding difficulties interfere seriously with the use of small pins in automated machinery which depends on regularly and precisely maintaining a number of coacting working cycles.

It is a broad object of the present invention to provide a novel and improved positioning device which automatically positions pins within a wide range of length, diameter and configuration in a predetermined position.

A more specific object of the invention is to provide a novel and improved pin positioning device which positions each pin fed to the device in a random position in a postion in the device from which position the pin may be inserted into a hole of a work piece by suitable manual or power tools.

Another more specific object of the invention is to provide a novel and improved pin positioning device which positions pins successively fed thereto in random position and effects such positioning without any moving parts and substantially without the assistance of gravity.

Still another object of the invention is to provide a novel and improved pin positioning device which is capable of automatically positioning pins of widely different length and diameter.

A further object of the invention is to provide a novel and improved pin positioning device with which pins can be positioned in any angular position between a horizontal position and a vertical position, or in any other position from which gravity would tend to dislodge the pin.

It is also a broad object of the invention to provide a novel and improved positioning device capable of automatically positioning and holding pins or similar bodies in a mold while the mold is filled with cast or injected metal or plastic, such pins or similar bodies subsequently forming inserts in the cast or molded article.

It is a further broad object of the invention to provide a novel and improved pin inserting or setting device which includes means for first automatically positioning a pin fed to the device in random position and manually or automatically operable means for driving a positioned pin into a receiving hole of a work piece.

A more specific object of the invention, allied with the preceding one, is to provide a novel and improved pin inserting or setting device which is capable of receiving and driving pins within a wide range of length, diameter and configuration.

Another more specific object of the invention is to provide a novel and improved pin inserting or setting device in which the positioning means and the driving means can be readily exchanged for differently dimensioned positioning means and driving means so that the same device can be adapted to a still wider range of pins and similar bodies to be inserted into a work piece or assembly.

As will be more fully explained hereinafter, the basic concept of the invention resides in utilizing the directional force of a magnetic field into which a body, particularly a body made at least partly of magnetizable material, is fed in random position for moving such body into a predetermined position with respect to the flux lines of the field. As it is evident, such orientation of each body subsequently fed into the same field will be automatically repeated therein.

Other and further objects, features and advantages of the invention will be pointed out hereinafter and set forth in the appended claims constituting part of the application.

In the accompanying drawing, several embodiments of the invention are shown by way of illustration and not by way of limitation.

In the drawing:

FIG. 1 is an elevational view, partly in section, of a pin positioning device according to the invention;

FIG. 2 is a plan view of a pin inserting device including pin positioning means;

FIG. 3 is an elevational side view of FIG. 2, partly in section;

FIG. 4 is a detail view of the pin positioning means of the device according to FIGS. 2 and 3;

FIG. 5 is a side view of FIG. 4;

FIG. 6 is a fragmentary elevational view of the pin positioning means as shown in FIG. 2;

FIG. 7 is a detail view of FIG. 3 on an enlarged scale illustrating the positioning of a pin by the device; and FIG. 8 is a plan view of a modification of the pin positioning device.

Referring first to FIG. 1 in detail, the positioning device exemplified in this figure comprises a magnet 1 shown as a slotted or U-shaped magnet. The magnet may be a permanent magnet as shown, or an electromagnet. The pole faces 1a of the magnet 1 are disposed in a common plane and support a support member 2 made of a non-magnetic material, such as plastic or a non-ferrous metal, for instance, bronze or aluminum. Member 2 is shown as a thin plate bridging the two pole faces and having in its side 2a opposite to the pole faces a groove 2b spanning the two pole faces. Groove 2b serves as a means for positioning a generally cylindrical body made entirely or partly of magnetizable material, such as a pin 3 in a predetermined position on the support plate, to wit, lengthwise in the groove.

As it is evident, the magnetic field of the magnet extends between the two pole faces and the density of the magnetic flux lines per cross sectional area unit is highest at approximately the shortest distance between the two pole faces. Accordingly, the flux density within the groove is higher than the flux density adjacent to the non-grooved area portions of the side 2a of member 2. The flux density is highest at the bottom of the groove, since the bottom is closest to the pole faces and it may be substantially zero adjacent to the non-grooved area portions of the support member.

As it is also evident, a magnetizable body, such as pin 3 placed upon plate 2 in random position, will automatically tend to orient itself into a position in which it is within the highest accessible density of the flux lines between the two pole faces. The position of the highest accessible density for the pin is obviously the position in the groove. In other words, a readily movable magnetizable member fed upon side 2a of member 2 in random position will always automatically position itself in a predetermined position thereon.

The positioning device shown in FIG. 1 is in a position in which support plate 2 is horizontal, but it is evident that the same automatic positioning of pin 3 is also obtained in any other angular position of the device, up to and including a position in which support plate 2 is vertical, or even upside down, provided only that the magnetic force acting upon the pin for orienting the same is greater than the force of gravity also acting upon the pin. This can be accomplished even by a comparatively weak magnet when the pin is small and its weight correspondingly low.

While the illustrated U-shaped or slotted configuration of the magnet is particularly suitable, the invention is by no means limited to such a configuration of the magnet. The magnet may have any configuration which permits placement of a support member in the magnetic field of the magnet so that it has a surface portion adjacent to which the flux density is higher than adjacent to another surface portion of the support member in the manner described in connection with FIG. 1. For instance, a bar magnet may be used in which case the groove in the support plate should extend lengthwise of the magnet.

The groove 2b shown in FIG. 1 has a semi-circular cross section to accommodate the generally cylindrical cross section of body 3. The diameter of the groove need not be identical with that of the pin but should be such that it will receive pins of different diameters within a reasonable range. FIG. 1 also shows that groove 2b can accommodate pins of different lengths. The illustrated pin occupies about one-half of the length of the groove, but it may, of course, occupy less or more.

It is not essential for the concept of the invention that the groove have a semi-circular cross section. It is merely necessary that there is a supporting surface portion adjacent to which the flux density is markedly higher than adjacent to other supporting surface portions of member 2. The support member 2 may, for instance, have a groove with a V-shaped cross section, or a groove with a rectangular cross section may be provided. The groove or more broadly the receiving area of support member 2 may also be formed by providing as support member two parts which are supported spaced apart upon the pole faces of magnet 1. With such an arrangement, body 3 will rest directly upon the pole faces bridging the gap therebetween when it is positioned in its predetermined position, that is, the body is subjected to substantially the highest magnetic attraction of which the magnet is capable. As it is evident in an arrangement of this kind, the pole faces themselves constitute in effect part of the supporting area of support member 2. The groove thus defined by the two parts of the support member may be given any desired cross section by appropriately shaping the respective edges of the support member parts.

As it is apparent from the analysis of the invention, the positioning action of the positioning device as exemplified in FIG. 1 is obtained by providing on the support member a preferential area to which the body to be positioned is magnetically attracted so that it will always tend to occupy a position in that area. As it is also apparent that in the absence of such preferential area, that is, an area adjacent to which the flux density is higher than adjacent to other areas of the support member, the body 3 will also be affected by the magnetic field permeating the gap between the two pole faces. However, it will not be biased always into the same predetermined position. When fed to the support member in random orientation, it will merely tend to occupy a position more or less aligned with the flux lines between the two pole faces, but such position will be a random position.

As it is also now evident, the recessed area in the support member as exemplified by groove 2 does not constitute a nest or cradle which must be more or less formfitting to position body 3 as is the case with conventional gravity fed devices, but the body is positioned in the groove by being "glued" to the bottom of the groove by magnetic attraction whatever the cross sectional peripheral outline of the groove may be. In other words, the body is always positioned by the magnetic force in the same position in the crosswise direction of the body in reference to the groove.

Pin 3 may be a solid, slotted, or hollow pin. The term "cylindrical" or "generally cylindrical" as used herein in connection with the element 3 to be positioned is not intended to be limited to the true mathematical significance of these terms. Accordingly, by way of example, body or element 3 may have a smooth peripheral surface which may or may not be slotted, and it may also be threaded along part of its length or its entire length. Body 3 may also have grooved or flattened surface portions. It may have a multi-cornered cross section, it may be a spirally wound pin, or it may have a springy or roughened bulge or collar. Many other shapes of the body to be positioned are readily conceivable, it is only essential that the configuration of the body is such that the magnetic force acting upon the same is capable of overcoming the friction between the body and the surface of its support for the purpose of directing the body into the aforedescribed predetermined position on plate 2.

The positioning device as shown in FIG. 1 may be used in assembly machines in which a pin positioned as shown in FIG. 1 is actuated upon by driving means for inserting the pin into a receiving hole of a work piece on an assembly.

It may also be used as part of a casting or plastic forming mold, as a positioning and holding device for generally cylindrical inserts. If the casting or molding process involves high temperatures, the magnet acting upon the pin should be made from material such as ceramic magnets whose magnetic characteristics are largely impervious to heat.

The inserts or pins may be positioned by hand before each casting or molding cycle. Alternatively, primitive drop chutes may be provided in the mold into which the operator drops the pins or inserts so that the pin is positioned in situ, that is, in its position of utilization.

As stated before, the pin or other body is always accurately positioned in the crosswise direction of the pin in reference to the groove, but there may be a slight deviation in the lengthwise position of the pin. Such deviation is immaterial when the positioning assembly is used in a pin inserting or setting device because the driving means of such device will act upon the pin in any lengthwise position thereof, provided the pin is correctly centered. However, if the pin is to be used as a mold insert, it is necessary or at least desirable that the pin is also lengthwise centered. Such lengthwise centering can be readily obtained by providing locating stops in the groove or by closing the groove at its ends as is shown in FIG. 8 in which the groove is in the shape of a milled cavity 90.

FIGS. 2 through 7 show, by way of example, a pin inserting or setting device which includes and utilizes a pin locating device similar to that shown in FIG. 1.

The pin inserting device or jig 10, according to FIGS. 2 through 7, comprises a base assembly 11, a positioning assembly 12 and an ejector assembly 13.

The base assembly comprises a base plate 15 on which guide rods 16 are mounted by suitable fastening means, such as nuts 17 and 18. Rods 16 support a block 20 which is secured in a selected position of height by any suitable means, such as set screws 21. The block 20 includes a chute or hopper 24 leading to the positioning assembly 12. The chute need not confine the position of the pins, nor control the velocity of their descent.

The positioning assembly is similar to the device described in connection with FIG. 1. It comprises a magnet 25, shown as a U-shaped or slotted permanent magnet. A support member 26 is secured upon the pole faces of the magnet by any suitable means, such as a bolt 27 extending from the support member and secured to the magnet by a nut 28. The alignment should be such that the groove is at right angle to the magnetic gap. The support member is made of a non-magnetic material such as a plastic or a non-magnetic metal, and has in its face a groove 26a to provide a region of increased flux density for positioning a pin 3 as has been described in connection with FIG. 1. As is clearly shown, the groove 26a is vertically disposed, that is, a pin positioned therein must be retained by the magnetic force against the force of gravity. While a simple grooved surface of the support member similar to the side 2a of FIG. 1 may be used in the device of FIGS. 2 through 7, it is advantageous to provide a receiving channel 26b by means of lateral raised portions 26c which constitute the side walls of the channel. This channel confines the movement of a pin 3 which falls through chute 24 upon support member 26 and constitutes, in effect, a continuation of chute 24, as can be clearly seen in FIGS. 3 and 7, thereby facilitating the positioning of the pin in groove 26a by the magnetic force as hereinbefore described. The receiving channel is preferably turned by approximately 40 degrees in relation to the groove 26a so as to better meet the exit of drop chute 24.

Further, the side walls 26c of the receiving channel provide space for guide holes 26d for the ejection plunger. In practice, these guide holes are drilled transversely before the receiving channel is milled. When the milling operation is completed, the transverse groove 26a is formed automatically, in absolute alignment with the guide holes.

The ejector assembly 13 comprises a knob 30, a plunger 33 and an ejector pin 34. The ejector pin is releasably and adjustably secured in plunger 33 by set screws 35 and by adjustment screw 40 or other suitable means. The plunger-pin assembly is lengthwise displaceable against the action of a spring 36 abutting against the top of collar 37 on block 20, and is accommodated within the block by a suitably dimensioned bore 28. This bore is continued by a bore 20b for the ejector pin as can be clearly seen in FIG. 3. As is also clearly shown in the figures, bore 20b is continued by holes 26d through the lateral raised portions 26c on support member 26.

As it is evident from FIG. 3, depression of the knob 30 against the action of spring 36 will drive a pin 3 in groove 26a, as it is shown in FIG. 7, through bores 20b and 26b into a receiving hole of a work piece suitably aligned with bore 20b. The stroke of the ejector pin is preferably adjustable. For this purpose, plunger sleeve 33, which is threaded into knob 30 by means of an external thread, has also an internal thread. The internal thread receives a slotted set screw 40 at the upper end of ejector pin 34. As it is clearly shown in FIG. 3, set screw 40 is accessible from the upper side of knob 30 whereby the position of the ejector pin within the plunger can be conveniently adjusted after loosening set screws 35.

As has been explained in connection with FIG. 1, the pin inserting or setting device is capable of operating with pins or other bodies within a wide range of dimensions.

Tests have shown that the pin inserting or setting device of the invention is capable to insert pins or other bodies of widely different diameters and lengths, without effecting changes or adjustments. It has been found that a device which has in its ejector assembly a plunger of 3/32" diameter may be used for pins of 1/16", 5/64" and 3/32" diameters and varying in length from 3/16" to 1/2" without change of the positioning assembly. The same device was found to be capable of handling all corresponding metric pins even though such pins deviate quite considerably from their inch equivalents.

If pins are to be positioned and driven beyond the range of the positioning assembly of the device, the same may be readily exchanged for a suitably dimensioned assembly. For this purpose, it is merely necessary to loosen a set screw 50, which engages a locating dimple 50a in the positioning assembly 12. Tightening of screw 50 in dimple 50a automatically secures the positioning assembly in the correct angular position in reference to chute 24. The entire assembly may then be withdrawn through an opening provided in the block or body 20 for the purpose and indicated at 51 by dotted lines in FIG. 2.

The plunger 33 and the ejector pin 34 of the ejector assembly may also be conveniently replaced, either for reasons of wear or to install a differently dimensioned ejector pin. For this purpose, a set screw 60 is loosened. Screw 60 extends into a slot 33a of plunger 33, thereby holding the entire ejector assembly within block 20 against the action of springs 36, and presenting involuntary rotation of the plunger.

A bore 65 having at its upper end a tapped threaded portion 65a is preferably provided in block 20 to accommodate a spare plunger and ejector pin.

Base plate 15 serves to receive and support thereon a work piece into which a pin 3 is to be inserted after being positioned and ejected as previously described. To facilitate alignment of the receiving hole in the work piece with the ejector bore 20b, a backstop 70 and two side stops 71 and 72 are provided. Backstop 70 is slidably guided in base plate 15 by means of two guide bars 73 and 74, which may be secured in any selected position of adjustment by set screws 75 or other suitable means.

Of course, other suitable guide means for backstop 70 may be provided, such as guide tracks.

Side stops 71, 72 are guided by means of a slotted plate 78 and 79, respectively. Nuts 17 may be utilized for locking slotted plates 78 and 79 in any selected position of adjustment. V-shaped grooves 80 and 81 in plate 15 may be used for centering a round work piece.

The operation of the inserting or setting device as hereinbefore described is self-evident from the previous description. A pin dropped into chute 24 will automatically locate itself in groove 26a irrespective of the position in which it reaches support member 26. Depression of knob 30 will eject the pin through bore 20b and into the receiving opening of a work piece suitably aligned with bore 20b as previously described.

In continuous operation, pins may be dropped from a cylical dispenser or other feeding device into chute 24 in random position and speed. To a certain extent, the chute itself may be used as a dispenser magazine. Since only one pin at a time can occupy the groove, a second pin will be held by magnetic attraction to the surface of support plate 2 and will move into the groove as soon as the first pin has been ejected by the plunger. However, it is generally not advisable to drop more than a few pins simultaneously into the chute, since otherwise the pins may form magnetic clusters at the entry to or on the surface of the positioning assembly.

The pin setting or inserting device is exemplified for manual operation, but it can be rapidly and conveniently converted to pneumatic, hydraulic or electric operation. For this purpose, it is merely necessary to detach knob 30 and to attach a pressure cylinder or solenoid to plunger 33. The tapped portion 65a of hole 65 for a spare plunger, facilitates the mounting of power drive means on block 20. Plunger 33 can then be power operated, with its cyclical movements controlled in a conventional fashion.

As it is evident, the positioning of any number of small magnetizable bodies, always in the same position, irrespective whether the positioning device 12 is mounted horizontally, vertically or in an intermediate angular position and also independently of the orientation of the component when arriving in the proximity of the positioning groove, can be utilized in numerous devices.

The base is designed as a universal holding jig for work pieces. In many applications, it is advantageous to replace the jig by other means for holding a work piece, or to remove block 20 altogether from the base assembly and install it by independent holding means, for example, as part of an automatic assembly machine.

The conversion of the manual tool to power operation is obvious to persons skilled in the art and hence is not further described in detail.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A device for positioning a body made at least partly of magnetizable material and fed to the device in random position, said device comprising a support means made of substantially non-magnetizable material and having a supporting surface, and means for generating adjacent to one supporting surface portion a higher density of magnetic flux lines per area unit than adjacent to another supporting surface portion, the surface portion having the higher density adjacent thereto constituting a receiver for orienting a body received in random position on said supporting surface into a predetermined position in reference to the support means.

2. A device for positioning a body made at least partly of magnetizable material and fed to the device in random position, said device comprising a magnet having two pole faces, and a support member made of substantially non-magnetizable material disposed in and substantially parallel to the magnetic flux lines extending between said pole faces, said support member having on a side remote from the pole faces a surface portion closer to the pole faces than the remaining surface portion of said side, said closer surface portion constituting a receiving area for orienting a body received on said support member in random position into a predetermined position on said support member.

3. A device for positioning a body made at least partly of magnetizable material and fed to the device in random position, said device comprising a magnet having two pole faces disposed approximately in a common plane, and a support member made of a substantially non-magnetizable material bridging the gap between said pole faces, said support member having on its side opposite to the pole faces a surface portion closer to the plane of the pole faces than the remaining surface portion of said side, said closer surface portion constituting a receiving area for orienting a body received in random position on said support member into a predetermined position on the support member.

4. A device for positioning a body made at least partly of magnetizable material and fed to the device in random position, said device comprising a generally U-shaped magnet, and a support member made of substantially non-magnetizable material and bridging the gap between the pole faces of said magnet, said support member having in its side opposite to said pole faces a depression oriented substantially parallel to the shortest flux line path between the pole faces, the surface area defining said depression being closer to the pole faces than the remaining surface area of said side and constituting a receiving area for orienting a body received in random position on said support member into a predetermined positon on said side of the support member.

5. A device for postioning a body made at least partly of magnetizable material and fed to the device in random position, said device comprising a generally U-shaped magnet, and a support member made of a substantially non-magnetizable material bridging the gap between the pole faces of said magnet, said support member having in its side opposite the pole faces a groove extending substantially across between the pole faces and lengthwise of the magnetic flux lines therebetween whereby the density of the magnetic flux lines substantially lengthwise traversing the groove is greater per area unit than adjacent to the remaining surface area of said side of the support member, said groove constituting a receiver for orienting a body received on the support member in random position into a predetermined position on the support member.

6. A device according to claim 5, wherein said support member comprises a non-ferrous metal plate.

7. A device according to claim 5, wherein said support member is plate-shaped and comprises a fastening means for fastening said plate-shaped member to said magnet in substantial abutment with the pole faces thereof.

8. A device according to claim 5, wherein the cross section of said groove generally matches the cross section of the body to be received therein.

9. A device according to claim 5 and comprising limit means for limiting the lengthwise positioning of the body in said groove.

10. A device for inserting a body made at least partly of magnetizable material into a receiving hole in a work piece, said device comprising positioning means for positioning the body in a predetermined position, said positioning means including a generally U-shaped magnet, and a support member made of substantially non-magnetizable material bridging the gap between the pole faces of said magnet, said support member having in its side opposite the pole faces a groove substantially extending across the gap between the pole faces substantially parallel to the magnetic flux lines therebetween whereby the density of the magnetic flux lines traversing the groove is greater than adjacent to the remaining surface of said side of the support member, said groove constituting a receiver for the body to be positioned in a predetermined position by the greater flux density; feed means for feeding the body in random position to said positioning means; and drive means for driving the body positioned in said groove into the receiving hole of a work piece.

11. A device for inserting a generally cylindrical body made at least partly of magnetizable material into a receiving hole of a work piece, said device comprising, in combination, a support structure; a positioning means supported on said support structure for positioning the body in a predetermined position, said positioning means including a generally U-shaped magnet, and a support member made of a substantially non-magnetizable material bridging the gap between the pole faces of said magnet, said support member having in its side opposite the pole faces a groove substantially extending across the gap between the pole faces substantially parallel to the magnetic flux lines therebetween whereby the density of the magnetic flux lines traversing the groove is greater than adjacent to the remaining surface of said side of the support member, said groove constituting a receiver for the body to be positioned in said predetermined position by the greater flux density in the groove, said support structure including a chute for feeding the body upon said support member in random position; and a drive means for driving the body positioned in said groove into a receiving hole of a work piece.

12. A device according to claim 11 and comprising adjustable means for holding a work piece in a position in which the receiving hole of the work piece is positioned for receiving said positioned body upon operation of said drive means.

13. A device according to claim 11, wherein said positioning means is a self-contained assembly detachably insertable into said support structure.

14. A device according to claim 13, wherein said assembly has a cylindrical cross section and is rotatably supported in the support structure for adjustment of the angular position of the groove of the support member in reference to said chute.

15. A device according to claim, 11 wherein the support member of said positioning means comprises a plate having on its side including the grooved raised poritions substantially aligned with said chute for directing the body passing through the chute upon said plate and to the vicinity of the groove for positioning the body therein.

16. A device according to claim 11, wherein said drive means comprise an ejector lengthwise displaceable in alignment with said groove, and a spring loaded plunger coacting with said ejector for displacement of the same through a predetermined stroke.

17. A device according to claim 16 and comprising means for adjusting the length of said stroke.

18. A device according to claim 11, wherein the support member of said positioning means comprises a plate having on its side including the groove raised portions substantially aligned with said chute and defining a channel for directing the body passing through the chute upon said plate and to the vicinity of the groove for positioning the body therein, and wherein said drive means comprise an ejector pin extending lengthwise displaceable within said support structure and said raised portions on the plate and in alignment with the groove in the plate, and a spring-loaded plunger coacting with said ejector pin for displacement of the same through a predetermined stroke.

19. A device according to claim 11, wherein said drive means is a self-contained assembly detachably mounted on the support structure.

20. A device for moving into a predetermined position at least partly magnetizable bodies fed to the device one by one in random position to a utilization position, said device comprising in combinaton:

a support means made of substantially non-magnetizable material and having a supporting surface;
magnetic means for generating adjacent to a surface portion of the support means a higher density of magnetic flux lines per area unit than adjacent to another surface portion of the support means, the surface portion having the higher density adjacent thereto constituting a receiver for orienting by magnetic attraction a body received on said supporting surface in random position into a predetermined position in reference to the support means;
feed means for feeding successive bodies one by one upon said supporting surface for orientation of each successive body by said receiver; and
actuating means for removing successive oriented bodies from said receiver for transport to the utilization position.

21. A device for moving into a predetermined position at least partly magnetizable bodies fed to the device one by one in random position to a utilization position, said device comprising in combnation:

positioning means for positioning the body in a predetermined position, said positioning means including a magnet and a support member made of substantially non-magnetizable material bridging the gap between the pole faces of said magnet, said support member having in its side opposite the pole faces a groove substantially extending across the gap between the pole faces substantially parallel to the magnetic flux lines therebetween whereby the density of the magnetic flux lines traversing the groove is greater than the flux density adjacent to the remaining surface area of said side of the support member, said groove constituting a receiver for the body to be positioned in a predetermined position by the magnetic attraction of greater flux density;
feed means for feeding successive bodies one by one upon said supporting surface for orienting each successive body by said receiver groove; and
actuating means for removing successive oriented bodies from said receiver groove for transport to a utilization position.

References Cited
UNITED STATES PATENTS

| | | | |
|---|---|---|---|
| 2,803,977 | 8/1957 | Surratt | 29—212 |
| 2,862,601 | 12/1958 | Littwin et al. | 198—25 |
| 3,033,144 | 5/1962 | Schmidt | 269—8 |
| 3,061,919 | 11/1962 | Tack | 29—203 X |
| 3,067,852 | 12/1962 | Barr | 198—33 |
| 3,067,495 | 12/1962 | Chase | 29—203 |
| 3,114,964 | 12/1963 | Bramson | 29—212 |
| 3,127,001 | 3/1964 | Ferris | 198—33 |
| 3,241,220 | 3/1966 | Cruckshank | 269—8 |

THOMAS H. EAGER, *Primary Examiner.*